W. G. READ.
Rotary-Harrows.
No. 157,542.  Patented Dec. 8, 1874.
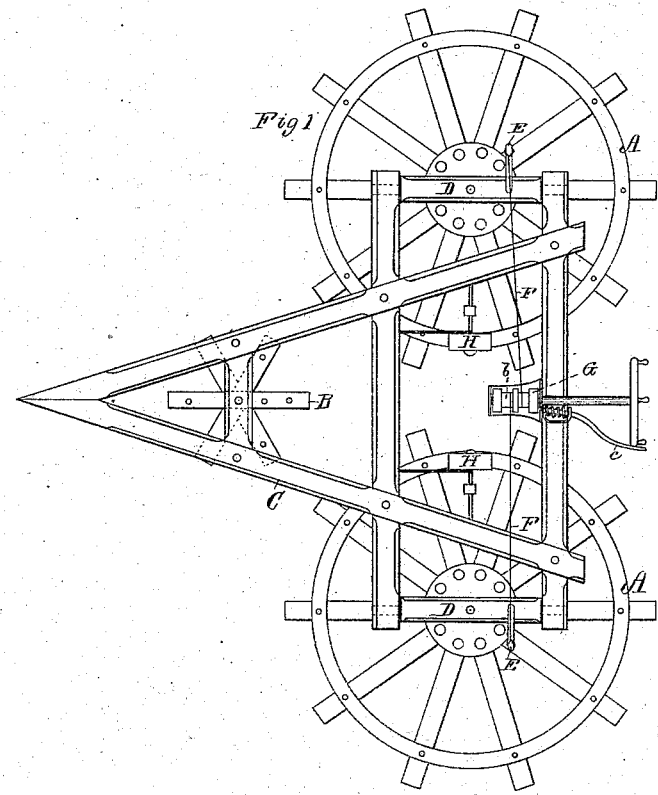
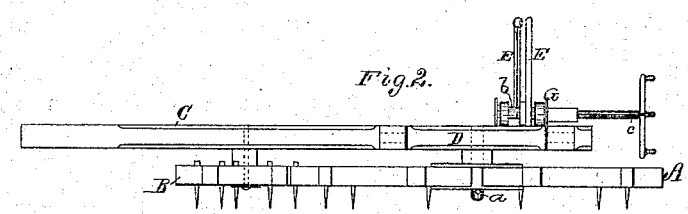
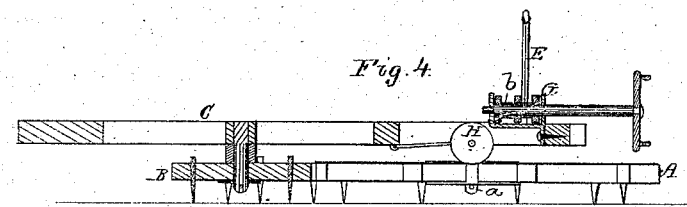
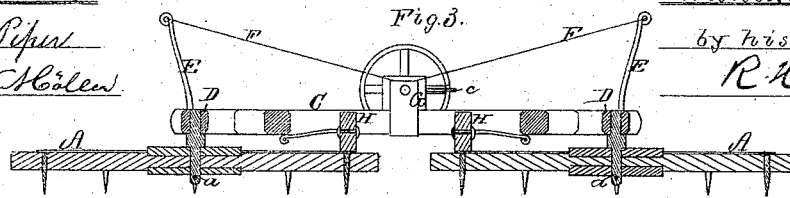
Witnesses  
S. N. Piper  
L. N. Holden
Walter G. Read,  
by his attorney  
R. H. Eddy

UNITED STATES PATENT OFFICE.

WALTER G. READ, OF COLUSA, CALIFORNIA.

IMPROVEMENT IN ROTARY HARROWS.

Specification forming part of Letters Patent No. 157,542, dated December 8, 1874; application filed August 27, 1874.

*To all whom it may concern:*

Be it known that I, WALTER G. READ, of Colusa, of the county of Colusa and State of California, have invented a new and useful Improvement in Rotary Harrows; and I do hereby declare the same to be fully described in the following specification and represented in the accompanying drawings, of which—

Figure 1 denotes a top view, Fig. 2 a side elevation, and Fig. 3 a transverse section, of a harrow provided with my invention; and Fig. 4, a longitudinal section of the same.

The machine, as shown, is provided with two main rotary harrows, A A, and one auxiliary one, B, arranged and combined with a supporting-frame, C, all being constructed as shown. The journal $a$ of each harrow A extends at right angles from one of two shafts, D D, arranged in the frame in manner as represented, and applied to it so as to be capable of revolving laterally in it. Arms E E extend up from the said shafts, and have ropes or lines F F fixed to them and the barrel $b$ of a windlass, G, applied to the frame C at its rear part, a spring-bolt, $c$, applied to the frame serving to hold the windlass from revolving when the ropes are wound upon it, so as to turn the shafts D D in a manner to bring both of the rotary harrows into upright positions in order for them to operate as wheels to support the machine by the ends of their radial arms on the ground. Wheels H H may be applied to the frame in positions, as shown, to support the rotary harrows while in revolution.

Should either of the harrows A A become obstructed by any trash or roots we can, by turning the windlass, incline the harrows more or less, so as to clear such of the obstructing material.

When it may be desired to move the machine from one place to another without having the teeth of the harrows in contact with the ground, both of the rotary harrows A A may be turned up at right angles with the ground, so as to rest thereon and operate as wheels.

I do not claim a rotary harrow convertible into a truck, particularly one constructed as represented in the United States Patent No. 92,422.

I claim—

In a harrow convertible into a truck, as described, the arms E, ropes F, and windlass G, combined and arranged with the frame C, and the shafts D, provided with the harrow-wheels applied to them, as specified.

WALTER G. READ.

Witnesses:
J. M. CULP,
JACOB BOWERS.